United States Patent [19]

Sabatino

[11] 3,967,980

[45] July 6, 1976

[54] METHOD FOR FORMING A DRY CHARGE-TYPE BATTERY ITSELF

[75] Inventor: Anthony Sabatino, St. Paul, Minn.

[73] Assignee: Gould Inc., Rolling Meadows, Ill.

[22] Filed: July 8, 1974

[21] Appl. No.: 486,659

[52] U.S. Cl. .............................................. 136/176
[51] Int. Cl.² ...................................... H01M 10/04
[58] Field of Search ............................... 136/176, 34

[56] References Cited
UNITED STATES PATENTS

| | | | |
|---|---|---|---|
| 1,802,818 | 4/1931 | Hutchinson | 136/34 |
| 2,518,527 | 8/1950 | Daily | 136/34 |
| 3,652,341 | 3/1972 | Halsall et al. | 136/176 |
| 3,834,946 | 9/1974 | Amlie et al. | 136/176 |

Primary Examiner—Donald L. Walton
Attorney, Agent, or Firm—Leydig, Voit, Osann, Mayer & Holt, Ltd.

[57] ABSTRACT

A method of manufacturing a lead-acid storage battery, capable of being stored after completing the battery processing and thereafter activated by the addition of electrolyte, includes forming the battery elements and treating the battery elements such that sufficient acid, in one form or another, will be retained in the elements to provide a battery operating electrolyte with a specific gravity in the range of from about 1.260 to 1.290, preferably about 1.265, upon activation with standard activation electrolyte, and charging if necessary. Completion of the processing involves draining the battery, reducing the amount of retained acid to a specified amount below the amount the battery elements are capable of retaining when saturated and suitably sealing.

3 Claims, No Drawings

METHOD FOR FORMING A DRY CHARGE-TYPE BATTERY ITSELF

RELATED APPLICATIONS

Sabatino and Rao, Ser. No. 377,563, filed July 9, 1973, now abandoned, for: Battery Vent Seal; and the continuation-in-part thereof, filed on even date herewith.

This invention relates to lead-acid storage batteries and, more particularly, to a method for manufacturing such batteries which are capable of being stored and thereafter activated by the addition of electrolyte, and charging if necessary, and to the resulting batteries themselves.

In recent years, considerable attention has been directed to dry charge batteries. This type of battery is formed, the formation electrolyte removed, and in one method the battery elements are then washed to remove any electrolyte residue, dried and then stored. It is ready for use merely by filling with the electrolyte. The advantages are numerous; the cost of shipping such batteries is substantially less than "wet" batteries in which the electrolyte adds significantly to the weight of the battery. Also, shelf life is relatively long; and, accordingly, inventory control is facilitated.

The full advantages of the dry charge battery have, however, not been fully realized because of the difficulties and the expense associated with washing and then completely drying the battery elements to remove the electrolyte used in forming and washing the elements. If not properly accomplished, chemical and electrochemical reactions can take place which adversely affect the initial battery performance. Thus, for example, oxidation of the negative plates can occur so as to significantly chemically discharge the plates, thereby adversely affecting the initial performance of the battery.

For the most part, prior techniques for removing the formation electrolyte have been directed to thoroughly washing and drying the battery elements after formation or charging so as to prevent the battery from losing its charge during storage. Thus, U.S. Pat. No. 2,880,520 uses a high velocity air stream. After drying, the battery elements are installed into battery containers, electrically connected and a cover bonded onto the container. U.S. Pat. No. 3,314,158 discloses installing the battery elements into the battery container and making the electrical connections prior to the formation, washing with water and drying steps. After the formation, a heated, nonoxidizing gas is impinged onto the top of the battery elements.

A more recent technique, shown in U.S. Pat. No. 3,652,341, discloses assembling the battery elements into the container and making the electrical connections, filling the battery cells with a forming electrolyte and then charging the battery elements. About 70 to 97 weight percent of the forming acid is then removed by applying an accelerative force, such as a centrifugal force, to the battery. According to this patent, a sufficient amount of forming acid should be removed from the battery elements to permit the achievement of the desired final specific gravity of the operating electrolyte after activation. When using the activation electrolyte employed for activating conventional dry charge batteries (i.e. — specific gravity of 1.265), the patent states that removal of the forming acid so that the amount retained in the elements is about 8 to about 15 percent by weight results in a final electrolyte specific gravity of 1.246 to 1.255, after discharge and charge cycling.

However, while the application of the accelerative force obviates the necessity for completely drying the battery elements to remove all of the residual formation electrolyte, the use of conventional activation electrolyte does not provide the result required. Thus, the use of conventional activation electrolyte does not result in the electrolyte, upon activation, reaching the industry accepted standard full charge gravity of 1.260 to 1.290, preferably 1.265, prior to service, due to the dilution of the activation electrolyte by the residual acid which remains in the battery during storage. While the utilization of activation electrolytes having higher gravities than those typically used can achieve the requisite full charge gravity level, this is impractical since such electrolytes are not typically stocked by those actually carrying out the activation of the batteries. Moreover, and quite obviously the stocking of odd types of activation electrolytes results in greater inventories when conventional dry charge batteries must also be activated.

It is accordingly an object of the present invention to provide a simple, inexpensive method for making a dry charge-type storage battery which is capable of being stored for extended periods of time and thereafter activated by the addition of conventional activation electrolyte and charging if necessary to provide the industry accepted full charge electrolyte specific gravity.

Another object of this invention provides a method for manufacturing such batteries which obviates the necessity for using a special activation electrolyte.

Yet another object lies in the provision of a storage battery which, after extended storage, can be activated by the addition of conventional activation electrolyte and charging if necessary to provide the industry accepted standard gravity levels corresponding to full state of charge.

A still further object provides a method for manufacturing such batteries which is compatible with existing processes for forming conventional dry charge batteries.

Other objects and advantages of the present invention will become apparent from the following detailed description.

While the invention is susceptible to various modifications and alternative forms, there is described in detail herein, the preferred embodiments. It is to be understood, however, that it is not intended to limit the invention to the specific forms disclosed. On the contrary, it is intended to cover all modifications and alternative forms falling within the spirit and scope of the invention as expressed in the appended claims. For example, while the present invention will be described herein primarily in connection with the preferred embodiment wherein the treating step is carried out in a separate step following the intitial formation, it should be appreciated that the method of the present invention is equally applicable to incorporating this step into the formation step so that the residual sulfuric acid retained in the battery during storage has a specific gravity in the range of 1.260 to 1.290. This can be achieved by carrying out the formation with a high gravity formation electrolyte, which will typically have a specific gravity of 1.100 or higher. Still further, while the discussion herein illustrates use of the present invention with a battery wherein the battery elements have been assembled and positioned in the container and the appropriate electrical connections made, the present invention is equally applicable, of course, to use wherein the battery plates have been formed either before or after assembly into the typical battery elements.

Turning now to a detailed discussion of the present invention, a typical lead-acid battery is first conventionally assembled. The battery elements, as is conventional, consist of a plurality of positive and negative plates with separators disposed therebetween. These are inserted into the cell compartments, and the electrical connections are then made.

The unformed, but fully assembled, battery may then be formed (viz. — charged). Formation electrolyte is added to the battery, and a current is applied thereto at a level and for times sufficient to achieve the desired end-of-charge voltage. As is well known, the concentration of the formation acid and the particular currents applied will vary with the type of forming employed and the battery-type involved. Typically, the formation electrolyte will be a sulfuric acid solution having a specific gravity ranging from 1.020 to 1.100. After the completion of the formation, the formation electrolyte is conventionally removed, as by merely inverting the container and dumping the electrolyte.

In accordance with the present invention, a treating step is then provided such that sufficient acid, in one form or another, will be retained within the battery elements to yield a battery operating electrolyte with a specific gravity in the range of from about 1.260 to 1.290, preferably about 1.265 for automotive and light commercial-type batteries, upon activation with standard activation electrolyte, and charging if necessary. To this end, and pursuant to a preferred embodiment of this invention, the treating step is carried out by adding to the battery a development electrolyte of a sufficiently high specific gravity so that the retained sulfuric acid will allow achievement of the required gravity for the battery operating electrolyte. The specific gravity of the development electrolyte will vary depending on the element size; however, it is generally suitable to utilize development electrolytes having specific gravities in the range of from about 1.265 to 1.350. The development electrolyte should be allowed to permeate the battery elements so that saturation will result. This can be accomplished, for example, by merely allowing the development electrolyte to stand in contact with the battery elements for about 10 minutes or even longer. This soaking is effective to allow the development electrolyte to diffuse and mix with the residual formation electrolyte retained within the elements. Alternatively, this may be accomplished by mechanically mixing the development electrolyte while in contact with the battery elements. Any conventional mechanical mixing means may be advantageously utilized.

After removal of the excess development electrolyte, as by inverting and draining the battery, and pursuant to an important aspect of this invention, the amount of retained acid is reduced below the amount the battery elements are capable of retaining when saturated. Thus, if the retained acid amount is not reduced below saturation, extended periods of storage can result in the growth of crystals or clusters of crystals that can bridge between adjacent positive and negative plates to create internal shorts, thereby irreversibly damaging the battery. Accordingly, the amount of retained acid is reduced to the point where, on standing during extended periods of storage (e.g. — 2 months or more), the residual acid will not migrate to the outer surfaces (particularly the bottom) of the battery elements so as to form liquid bridges (between plates and separators or between exposed areas of adjacent plates) that result in crystal growth and clusters of crystals creating internal shorts. The determination of whether the retained acid amount has been sufficiently reduced can be made by means such as a visual inspection. The reduction step can be carried out by any known means such as an accelerative force as shown in U.S. Pat. No. 3,652,341 cited herein, vacuum drying or the like.

The particular means used for the reduction step should, of course, be coordinated with the treating step to insure that the gravity of the retained acid is as is required. For example, as is known, vacuum drying tends to preferentially remove the water (compared to the rate of removal of acid) from the elements which thus increases the gravity of the retained acid. Accordingly, if vacuum drying is utilized in the reduction step, the gravity of the development electrolyte should be lower than that when an accelerative technique, such as centrifuging, is employed.

Following the reduction of the acid to obtain the appropriate retained acid content in the battery elements, the battery may then be suitably sealed and stored. If desired, the battery may be completely sealed; however, it is preferred to only substantially seal the battery so that the ingress of air is substantially prevented. Thus, because the batteries processed according to the present invention do retain residual electrolyte, there is some internal generation of gases such as hydrogen caused by self-discharge of the negative active materials during extended storage. If the batteries are totally sealed to protect against oxidation, there can be some bulging of the containers as a result of hydrogen or other gas build-up. This bulging can cause permanent deformation of the containers or ejection of vent covers which do not allow gas egress. For these reasons, it is therefore preferred to seal the battery in such a fashion that the ingress of air is substantially prevented while permitting the gaseous atmosphere within the battery, after a slight pressure build-up, to be vented therefrom.

This substantial sealing can be accomplished by using the vented seal shown in the Rao and Sabatino applications, previously cited, whose disclosures are herein incorporated by reference. According to these applications, the vented seal includes a means communicating with the atmosphere such as a suitably sized aperture or channel.

After storage, and when it is desired to activate the battery for service, activation is accomplished by the addition of conventional activation electrolyte, having a specific gravity of about 1.265, and charging if necessary. In view of the adjustment of the residual acid in the battery processing, the gravity level after activation will be in the required range, i.e. — from about 1.260 to 1.290.

In stating that the electrolyte of the battery, upon activation with activation electrolyte having a specific gravity of 1.265, will have an acceptable initial specific gravity for normal operation, i.e. — 1.260 to 1.290, it should be recognized that, during storage, the residual acid in the battery elements may be partially consumed in various reactions, depending upon the length of storage time. Thus, upon activation with activation electrolyte, the initial specific gravity of the battery may be somewhat less than the desired specific gravity of 1.260 to 1.290. However, charging the battery will reconstitute the electrolyte to the desired specific gravity level. Thus, there is sufficient acid in the battery elements in one form or another to insure that the battery operating electrolyte will initially have the desired specific gravity level, either upon activation with activation electrolyte alone, or upon activation with such electrolyte and charging.

An alternative embodiment of this invention involves carrying out the treating step providing the requisite retained acid by partial discharging of the battery plates after completion of the formation step. By suitable selection of the specific gravity of the formation electrolyte and the extent of the partial discharge, the amount of sulfate formed will combine with the retained acid to provide the acceptable initial specific gravity for normal operation after activation. This method is less desired since any extended period of storage will generally require that activation include suitable charging.

The extent of the partial discharge and the specific gravity of the formation electrolyte vary depending upon the battery size and type and the amount of the retained acid. For example, with a Group 24 automotive battery (81 Amp. Hr. capacity), wherein a formation electrolyte having a specific gravity of 1.060 is used, a partial discharge after formation to remove 10 Amp. Hrs., followed by draining and centrifuging or the like to remove 87.4 percent by volume of the electrolyte, will allow the battery operating electrolyte to have a specific gravity of 1.265 after activation with conventional activation electrolyte (1.265 specific gravity) and charging. With this same battery, the use of formation electrolyte of 1.100 specific gravity allows reaching the same battery operating electrolyte gravity with a 10 Amp. Hr. discharge when only 84.5 percent by volume of the electrolyte is removed.

If desired, the partial discharge can be preceded or succeeded by the addition of a development electrolyte as in the preferred embodiment. This will not, however, be typically necessary. Completion of the processing can then be carried out as has been described herein.

Thus, as has been seen, the present invention provides a ready method for forming dry charge-type batteries which can be activated by the use of conventional activation electrolyte, yet result in development of the industry accepted full charge electrolyte gravity level of from 1.260 to 1.290. The proper reduction of the retained acid in the battery elements insures that the growth of crystals or clusters of crystals leading to internal shorts will be prevented.

I claim as my invention:

1. A method of manufacturing a lead-acid storage battery including a container having a plurality of cell compartments and a plurality of battery elements consisting of a plurality of positive and negative plates with separators positioned therebetween, the battery elements being electrically connected, to provide a battery capable of being stored and thereafter activated by the addition of activation electrolyte, and, if required, charging, which comprises forming the plates by bringing said plates into contact with a formation electrolyte and applying current thereto at levels and for time to reach the desired end-of-charge voltage, treating the battery elements such that sufficient acid will be retained in the elements to provide, upon activation, including the addition of activation electrolyte having a specific gravity of about 1.265, a battery operating electrolyte having a specific gravity in the range of from about 1.260 to 1.290, the formation electrolyte being drained from the battery and said treating being carried out by adding a development electrolyte and allowing the development electrolyte to diffuse into and saturate the battery elements and mix with the residual formation electrolyte therein, draining the battery leaving the battery elements substantially saturated, reducing the level of residual acid retained in the battery plates sufficiently below saturation so that, on standing, the retained acid will not migrate to the outer surfaces of the battery elements so as to form liquid bridges between the plates and separators that result in crystal growth and clusters of crystals creating internal shorts, and sealing the battery.

2. The method of claim 1 wherein said treating is carried out so as to provide a battery operating electrolyte having a specific gravity of about 1.265.

3. A method of manufacturing a lead-acid storage battery including a container having a plurality of cell compartments and a plurality of battery elements consisting of a plurality of positive and negative plates with separators positioned therebetween, the battery elements being electrically connected, to provide a battery capable of being stored and thereafter activated by the addition of activation electrolyte, and, if required, charging, which comprises forming the plates by bringing said plates into contact with a formation electrolyte and applying current thereto at levels and for time to reach the desired end-of-charge voltage, treating the battery elements such that sufficient acid will be retained in the elements to provide, upon activation, including the addition of activation electrolyte having a specific gravity of about 1.265, a battery operating electrolyte having a specific gravity in the range of from about 1.260 to 1.290, said treating being carried out by partially discharging the formed battery elements, draining the battery leaving the battery elements substantially saturated, reducing the level of residual acid retained in the battery plates sufficiently below saturation so that, on standing, the retained acid will not migrate to the outer surfaces of the battery elements so as to form liquid bridges between the plates and separators that result in crystal growth and clusters of crystals creating internal shorts, and sealing the battery.

* * * * *